(12) United States Patent
Hirano et al.

(10) Patent No.: US 10,795,099 B2
(45) Date of Patent: Oct. 6, 2020

(54) OPTICAL CONNECTING DEVICE, METHOD FOR FABRICATING OPTICAL CONNECTING DEVICE

(71) Applicant: SUMITOMO ELECTRIC INDUSTRIES, LTD., Osaka (JP)

(72) Inventors: Mitsuharu Hirano, Osaka (JP); Akira Furuya, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/415,772

(22) Filed: May 17, 2019

(65) Prior Publication Data
US 2019/0361179 A1 Nov. 28, 2019

(30) Foreign Application Priority Data
May 25, 2018 (JP) .................... 2018-100580

(51) Int. Cl.
G02B 6/36 (2006.01)
G02B 6/42 (2006.01)
G02B 6/38 (2006.01)

(52) U.S. Cl.
CPC ......... *G02B 6/4239* (2013.01); *G02B 6/3632* (2013.01); *G02B 6/3839* (2013.01); *G02B 6/3885* (2013.01); *G02B 6/4243* (2013.01); *G02B 6/4214* (2013.01)

(58) Field of Classification Search
None
See application file for complete search history.

(56) References Cited

U.S. PATENT DOCUMENTS

| 5,037,179 | A | * | 8/1991 | Bortolin | G02B 6/3839 |
| | | | | | 385/54 |
| 5,379,360 | A | * | 1/1995 | Ota | G02B 6/30 |
| | | | | | 385/59 |
| 6,295,404 | B1 | * | 9/2001 | Ichigi | G02B 6/3636 |
| | | | | | 385/137 |

(Continued)

OTHER PUBLICATIONS

Carroll, Lee, et al,. "Photonic Packagina: Transforming Silicon Photonic Integrated Circuits into Photonic Devices", Applied Sciences, 2016, 6, p. 426.

*Primary Examiner* — Michael Stahl
(74) *Attorney, Agent, or Firm* — Smith, Gambrell & Russell, LLP

(57) ABSTRACT

An optical connecting device includes: a holder part having first and second holder members and a resin body therebetween; and multiple optical fibers each having first and second resin-uncoated fiber portions and the first and second resin-coated fiber portions. The first resin-uncoated fiber portion is disposed between first portions of the first and second holder members so as to extend in a direction of a first axis and be arranged along a first reference plane. The second resin-uncoated fiber portion and the first resin-coated fiber portion extend between second portions of the first and second holder members. One of the first and second holder members has a through-hole, extending along a second axis intersecting the first axis in the second portions thereof, receiving the resin body. The first and second holder members have first and second inner faces, separated away from the first reference plane, in the second portions, respectively.

16 Claims, 8 Drawing Sheets

(56) References Cited

U.S. PATENT DOCUMENTS

| | | | | |
|---|---|---|---|---|
| 2001/0001623 A1* | 5/2001 | Inada | ................ | G02B 6/255 |
| | | | | 385/99 |
| 2005/0018993 A1* | 1/2005 | Rolston | ............ | G02B 6/3839 |
| | | | | 385/137 |
| 2018/0088282 A1* | 3/2018 | Hirano | ............ | G02B 6/3616 |

* cited by examiner

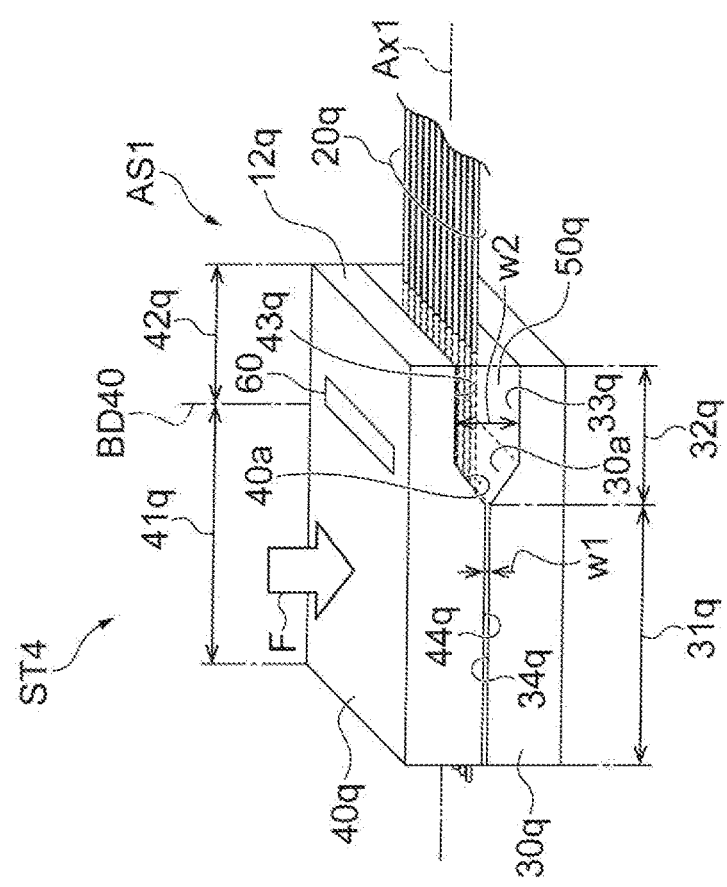
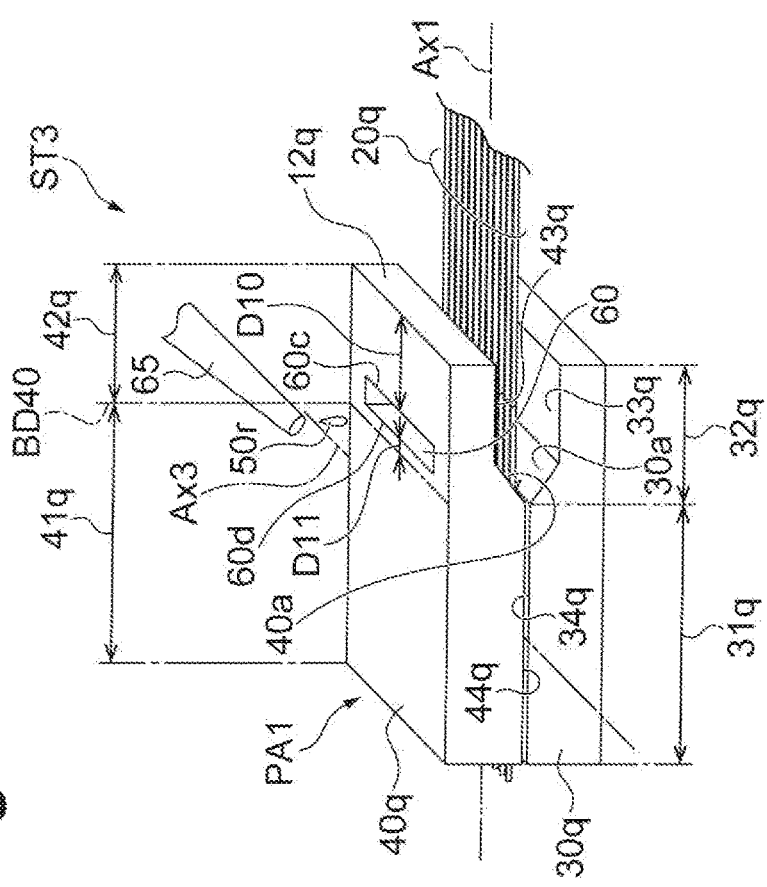
Fig.6A
Fig.6B

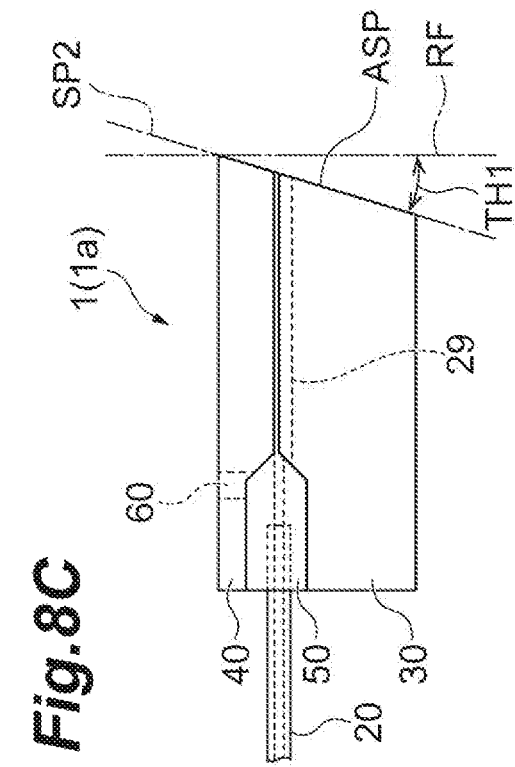
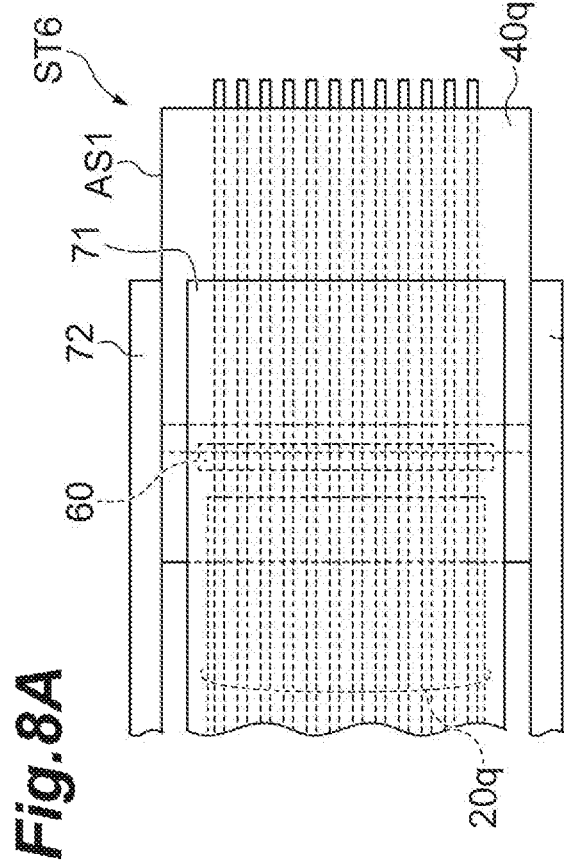
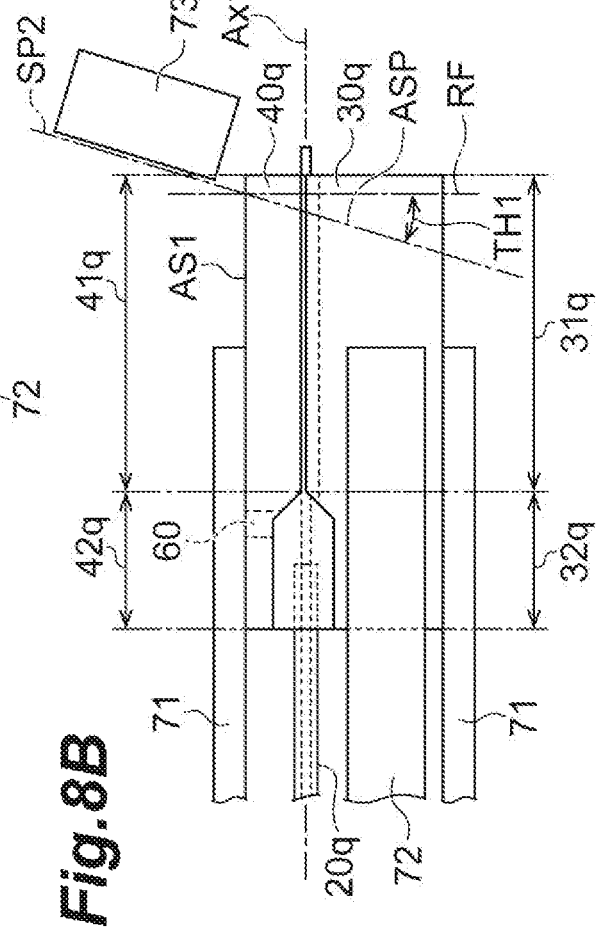

OPTICAL CONNECTING DEVICE, METHOD FOR FABRICATING OPTICAL CONNECTING DEVICE

BACKGROUND OF THE INVENTION

Field of the Invention

The present invention relates to an optical connecting device and a method for fabricating an optical connecting device. This application claims the benefit of priority from Japanese Patent application No. 2018-100580 filed on May 25, 2018, which is herein incorporated by reference in its entirety.

Related Background Art

L. Carroll et al., "Photonic Packaging: Transforming Silicon Photonic Integrated Circuits into Photonic Devices", Appl. Sci., Vol. 6, 426 (2016), referred to as Non-Patent Document 1, discloses a silicon photonic integrated circuit.

SUMMARY OF THE INVENTION

An optical connecting device according to one aspect of the present embodiment includes: a holder part having a first end and a second end, the first end being opposite to the second end, the holder part including a first holder member, a second holder member, and a resin body, the first holder member having a first portion and a second portion, the first portion and the second portion of the first holder member being arranged in a direction of a first axis, the second holder member having a first portion and a second portion, the first portion and the second portion of the second holder member being arranged in the direction of the first axis, and the resin body bonding the first holder member to the second holder member; and multiple optical fibers each having a first resin-uncoated fiber portion, a second resin-uncoated fiber portion, a first resin-coated fiber portion, and a second resin-coated fiber portion, the first resin-uncoated fiber portion being disposed between the first portion of the first holder member and the first portion of the second holder member so as to extend in the direction of the first axis, the second resin-uncoated fiber portion and the first resin-coated fiber portion being disposed between the second portion of the first holder member and the second portion of the second holder member, the second resin-coated fiber portion being disposed outside of the first holder member and the second holder member, and the multiple optical fibers being arranged along a first reference plane between the first portion of the first holder member and the first portion of the second holder member, the first holder member and the second holder member being arranged in a direction of a second axis intersecting the first axis, one of the second portion of the first holder member and the second portion of the second holder member having a through-hole, the through-hole extending in the direction of the second axis, the first holder member having a first inner face in the second portion thereof, the second holder member having a second inner face in the second portion thereof, the first inner face of the second portion of the first holder member and the second inner face of the second portion of the second holder member extending in the direction of the first axis to the second end, and the resin body being disposed between the first portion of the first holder member and the first portion of the second holder member, between the second portion of the first holder member and the second portion of the second holder member, and in the through-hole.

A method for fabricating an optical connecting device according to another aspect of the present embodiment includes: preparing a first holder member, a second holder member, and multiple optical fibers, the first holder member having a first portion and a second portion, the second holder member having a first portion and a second portion, each of the multiple optical fibers having a first resin-uncoated fiber portion, a second resin-uncoated fiber portion, a first resin-coated fiber portion and a second resin-coated fiber portion, and one of the second portion of the first holder member and the second portion of the second holder member having a through-hole; forming a preliminary assembly by disposing the first resin-uncoated fiber portion between the first portion of the first holder member and the first portion of the second holder member such that the second resin-uncoated fiber portion and the first resin-coated fiber portion are located in a gap between the second portion of the first holder member and the second portion of the second holder member and the second resin-coated fiber portion extends outward from the gap, the first portion and the second portion of the first holder member being arranged in a direction of a first axis in the preliminary assembly, the first portion and the second portion of the second holder member being arranged in the direction of the first axis in the preliminary assembly, the first resin-uncoated fiber portion extending along the first portion of the first holder member and the first portion of the second holder member in the direction of the first axis in the preliminary assembly, the multiple optical fibers being arranged along a first reference plane between the first portion of the first holder member and the first portion of the second holder member, and the through-hole extending in a direction of a second axis intersecting the first axis; disposing resin in the gap by supplying resin material to the gap via the through-hole, the first holder member having a first inner face in the second portion thereof, the second holder member having a second inner face in the second portion thereof, the first inner face of the second portion of the first holder member and the second inner face of the second portion of the second holder member extending in the direction of the first axis to respective ends of the first holder member and the second holder member and being separated away from the first reference plane, and the resin making contact with the first inner face of the second portion of the first holder member and the second inner face of the second portion of the second holder member; and curing the resin to form an assembly including the first holder member, the second holder member, a resin body between the first holder member and the second holder member, and the multiple optical fibers, the resin body bonding the first holder member and the second holder member to each other, the second resin-uncoated fiber portion and the first resin-coated fiber portion being away from the first inner face of the second portion of the first holder member and the second inner face of the second portion of the second holder member in the assembly.

BRIEF DESCRIPTION OF THE DRAWINGS

The above-described objects and the other objects, features, and advantages of the present invention become more apparent from the following detailed description of the preferred embodiments of the present invention proceeding with reference to the attached drawings.

FIG. 6A is a schematic view showing a major step in the method according to the example of the embodiment.

FIG. 6B is a schematic view showing a major step in the method according to the example of the embodiment.

FIG. 8A is a schematic view showing a major step in the method according to the example of the embodiment.

FIG. 8B is a schematic view showing a major step in the method according to the example of the embodiment.

FIG. 8C is a schematic view showing the optical connecting device that the present method brings into completion.

DESCRIPTION OF THE EMBODIMENTS

Figure 1A:
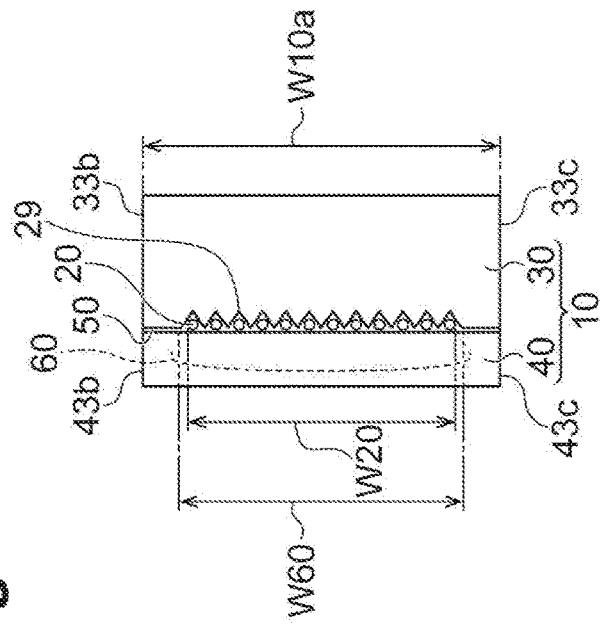
FIG. 1A is a schematic top view showing an optical connecting device according to an example of the embodiment.

A semiconductor chip may be provided with a silicon photonic integrated circuit, which needs to be coupled to optical waveguides through an optical connecting device in order to enable optical communications therebetween. This optical coupling requires the optical connecting device to have a small size because the optical connecting device is to be aligned to the optical waveguides of silicon photonic integrated circuit on the semiconductor chip. The compact optical connecting device includes an array of optical fibers and two holder components, which hold the array of optical fibers therebetween.

The inventors' teachings reveal that making two holder components small in size and thin in thickness can reduce the size of the optical connecting device. These holder components are bonded to each other by curing resin therebetween. The cured resin that secures the holder components may determine the mechanical strength of the optical connecting device. Specifically, the method for fabricating the optical connecting device arranges the holder components and uses resin of a low viscosity, which can flow into a narrower portion of a gap between the holder components, to fill the narrower portion. The low viscosity resin may not, however, fill a wider portion of the gap to produce voids in the cured resin (referred to as a resin body in the optical connecting device). The voids in the resin body may make the mechanical strength of the optical connecting device reduced, which may prevent the optical connecting device from having a desired mechanical strength.

What is needed is to provide an optical connecting device with a structure that allows a desired mechanical strength and to provide a method for fabricating the optical connecting device.

A description will be given of an optical connecting device according to examples.

An optical connecting device according to an example includes: (a) a holder part having a first end and a second end, the first end being opposite to the second end, the holder part including a first holder member, a second holder member, and a resin body, the first holder member having a first portion and a second portion, the first portion and the second portion of the first holder member being arranged in a direction of a first axis, the second holder member having a first portion and a second portion, the first portion and the second portion of the second holder member being arranged in the direction of the first axis, and the resin body bonding the first holder member to the second holder member; and (b) multiple optical fibers each having a first resin-uncoated fiber portion, a second resin-uncoated fiber portion, a first resin-coated fiber portion, and a second resin-coated fiber portion, the first resin-uncoated fiber portion being disposed between the first portion of the first holder member and the first portion of the second holder member so as to extend in the direction of the first axis, the second resin-uncoated fiber portion and the first resin-coated fiber portion being disposed between the second portion of the first holder member and the second portion of the second holder member, the second resin-coated fiber portion being disposed outside of the first holder member and the second holder member, and the multiple optical fibers being arranged along a first reference plane between the first portion of the first holder member and the first portion of the second holder member. The first holder member and the second holder member are arranged in a direction of a second axis intersecting the first axis. One of the second portion of the first holder member and the second portion of the second holder member has a through-hole. The through-hole extends in the direction of the second axis. The first holder member has a first inner face in the second portion thereof. The second holder member has a second inner face in the second portion thereof. The first inner face of the second portion of the first holder member and the second inner face of the second portion of the second holder member extend in the direction of the first axis to the second end, and the resin body is disposed between the first portion of the first holder member and the first portion of the second holder member, between the second portion of the first holder member and the second portion of the second holder member, and in the through-hole.

The optical connecting device provides the first and second holder members with the first and second inner faces at their second portions, respectively, and the first and second inner faces extend in the direction of the first axis to the second end so as to form a gap between the second portions of the first and second holder members. This gap is filled with the resin body, which covers both the side face of the second resin-uncoated fiber portion and the end and side face of the coating resin of the first resin-coated fiber portion disposed between the second portions of the first and second holder members. The resin body holds the second resin-uncoated fiber portion and the first resin-coated fiber portion of each of the multiple optical fibers in the gap, which the through-hole of one of the first and second holder members extends in the second axis to reach. The through-hole is used to supply resin enough to fill the gap, thereby forming the resin body. Filling the gap with a sufficient amount of resin makes the mechanical strength of the optical connecting device great.

In the optical connecting device according to an example, the first portion of the first holder member has a length greater than that of the second portion of the first holder member.

The optical connecting device provides the first holder member with the first portion longer than the second portion of the first holder member in length to increase the mechanical strength of the optical connecting device.

In the optical connecting device according to an example, the first holder member has a first inner face in the first portion thereof. The second holder member has a second inner face in the first portion thereof. The first inner face of the first portion of the first holder member and the second inner face of the first portion of the second holder member extend in the direction of the first axis. An interval between the first inner face of the second portion of the first holder member and the second inner face of the second portion of the second holder member is greater than that between the first inner face of the first portion of the first holder member and the second inner face of the first portion of the second holder member.

The optical connecting device makes the distance between the first and second inner faces of the first and second holder members in their second portions greater than that between the first and second inner faces of the first and second holder members in their first portions. This difference in spacing makes the first volume of the resin portion, which fills the gap between the first end second inner faces of the first and second holder members in their first portions, larger than the second volume of the resin portion, which fills the gap between the first and second inner faces of the first and second holder members in their second portions. The large amount of the resin body bonds the holder members to each other to hold the multiple optical fibers, specifically the second resin-uncoated fiber portion between the holder members.

In the optical connecting device according to an example, the first portion of the first holder member includes a part having a thickness greater than that of the second portion of the first holder member.

The optical connecting device provides the first holder member with the first portion, which has a thickness larger than the second portion thereof, to makes the mechanical strength great. The optical connecting device also provides the second holder member with the first portion, which has a thickness larger than the second portion thereof, to makes the mechanical strength great.

In the optical connecting device according to an example, the first resin-uncoated fiber portion has an end at the first end of the holder part.

The optical connecting device can couple the multiple optical fibers, held by the holder members, to an optical semiconductor device, such as a silicon photonic device, at the end of the first resin-uncoated fiber portion, which is positioned at the first end of the optical connecting device.

In the optical connecting device according to an example, the first end of the holder part has an end face extending along a second reference plane inclined at an acute angle with respect to the first reference plane.

The optical connecting device can effectively couple the multiple optical fibers, held by the holder members, to an optical semiconductor device, such as a silicon photonic device, at the fiber end faces, which extend along the second reference plane.

In the optical connecting device according to an example, the first holder member has an end face in the first portion thereof. The end face of the first holder member extends along a second reference plane inclined at an acute angle with respect to the first reference plane at the first end. The second holder member has an end face in the first portion thereof. The end face of the second holder member extends along a third reference plane extending in the direction of the second axis, and the holder part has a face extending along a fourth reference plane inclined at an acute angle with respect to the second reference plane such that the face of the holder part is disposed between the end face of the first holder member and the end face of the second holder member. The first resin-uncoated fiber portion has an end face and a cladding face, and the end face of the first resin-uncoated fiber portion extends along the second reference plane and the cladding face of the first resin-uncoated fiber portion extends along the fourth reference plane.

The optical connecting device can effectively couple the multiple optical fibers, held by the holder members, to an optical semiconductor device, such as a silicon photonic device, through both the fiber end faces, which extend along the second reference plane, and the cladding faces, which extend along the fourth reference plane.

A method for fabricating an optical connecting device according to an example includes steps of: (a) preparing a first holder member, a second holder member, and multiple optical fibers, the first holder member having a first portion and a second portion, the second holder member having a first portion and a second portion, each of the multiple optical fibers having a first resin-uncoated fiber portion, a second resin-uncoated fiber portion, a first resin-coated fiber portion and a second resin-coated fiber portion, and one of the second portion of the first holder member and the second portion of the second holder member having a through-hole; (b) forming a preliminary assembly by disposing the first resin-uncoated fiber portion between the first portion of the first holder member and the first portion of the second holder member such that the second resin-uncoated fiber portion and the first resin-coated fiber portion are located in a gap between the second portion of the first holder member and the second portion of the second holder member and the second resin-coated fiber portion extends outward from the gap, the first portion and the second portion of the first holder member being arranged in a direction of a first axis in the preliminary assembly, the first portion and the second portion of the second holder member being arranged in the direction of the first axis in the preliminary assembly, the first resin-uncoated fiber portion extending along the first portion of the first holder member and the first portion of the second holder member in the direction of the first axis in the preliminary assembly, the multiple optical fibers being arranged along a first reference plane between the first portion of the first holder member and the first portion of the second holder member, and the through-hole extending in a direction of a second axis intersecting the first axis; (c) disposing resin in the gap by supplying resin material to the gap via the through-hole, the first holder member having a first inner face in the second portion thereof, the second holder member having a second inner face in the second portion thereof, the first inner face of the second portion of the first holder member and the second inner face of the second portion of the second holder member extending in the direction of the first axis to respective ends of the first holder member and the second holder member and being separated away from the first reference plane, and the resin making contact with the first inner face of the second portion of the first holder member and the second inner face of the second portion of the second holder member; and (d) curing the resin to form an assembly including the first holder member, the second holder member, a resin body between the first holder member and the second holder member, and the multiple optical fibers, the resin body bonding the first holder member and the second holder member to each other, the second resin-uncoated fiber portion and the first resin-coated fiber portion being away from the first inner face of the second portion of the first holder member and the second inner face of the second portion of the second holder member in the assembly.

The method according to an example further includes a step of holding the assembly to polish the multiple optical fibers, the first holder member and the second holder member at the first portion of the first holder member and the first portion of the second holder member.

The method involves a step for arranging the first and second holder members such that the first and second inner faces of the first and second holder members extend in the direction of the first axis to form a space between the second portions of the first and second holder members, referred to as a gap. The gap is filled with the resin body, which is formed between the second portions of the first and second holder members, to coat both the side face of the second resin-uncoated fiber portion and the end and the side face of the coating resin of the first resin-coated fiber portion. The resin body in the gap holds the second resin-uncoated fiber portion and the first resin-coated fiber portion in each of the optical fibers. The first holder member is provided with the through-hole, which extends in the second axis to reach the gap. The through-hole is used to supply resin to the gap therethrough. The resin body thus supplied forms a structure in the optical connecting device, which can be provided with a mechanical strength enough to use it.

The method according to an example includes the step of holding the assembly to polish the multiple optical fibers, the first holder member and the second holder member at the first portion of the first holder member and the first portion of the second holder member.

This method provides the preliminary assembly with the gap, which is formed between the first and second inner faces that extend in the direction of the first axis to the second end. The gap is filled with resin, which is supplied in the direction of the second axis through the through-hole. This way to supply resin can give the gap a sufficient amount of resin. The resin thus supplied is cured to hold both the side face of the second resin-uncoated fiber portion and the end and the side face of the coating resin of the first resin-coated fiber portion, thereby providing the assembly with a mechanical strength enough to endure force applied thereto in the polishing process.

Teachings of the present invention can be readily understood by considering the following detailed description with reference to the accompanying drawings shown as examples. Referring to the accompanying drawings, an optical connecting device and a method for fabricating an optical connecting device according to examples of the present embodiment will be described below. To facilitate understanding, identical reference numerals are used, where possible, to designate identical elements that are common to the figures.

Figure 1B:
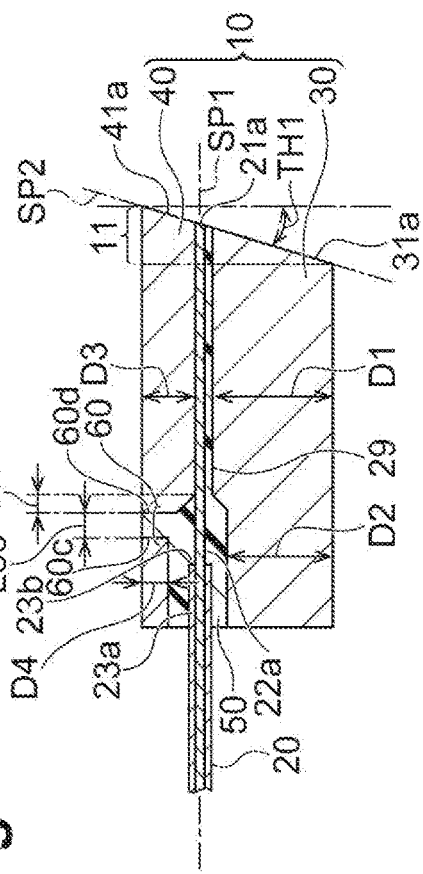
FIG. 1B is a schematic front view showing the optical connecting device according to the example.
Figure 1C:
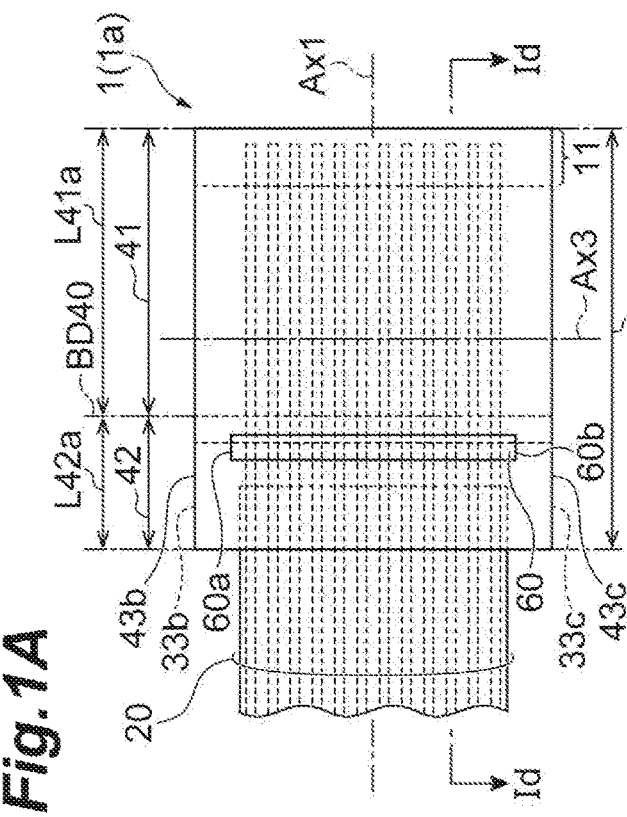
FIG. 1C is a schematic side view showing the optical connecting device according to the example.
Figure 1D:
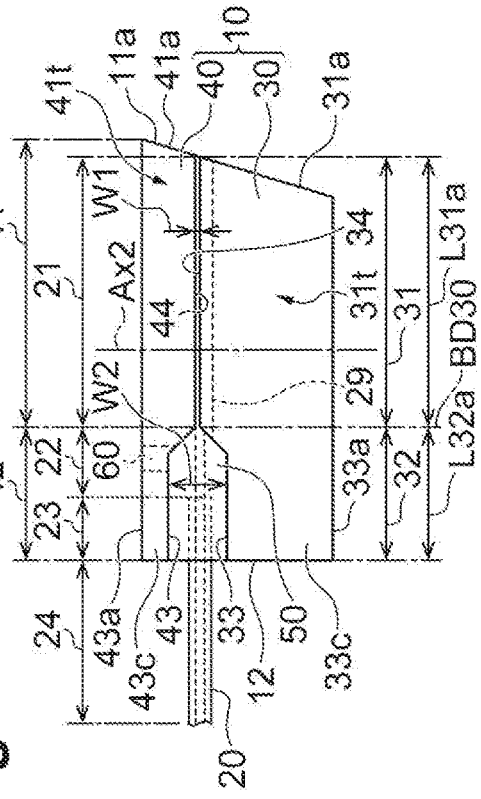
FIG. 1D is a schematic cross sectional view, taken along line Id-Id, showing the optical connecting device according to the example.

FIG. 1A is a schematic plan view showing an optical connecting device according to an embodiment. FIG. 1B is a schematic front view showing the optical connecting device according to the embodiment. FIG. 1C is a schematic side view showing the optical connecting device according to the embodiment. FIG. 1D is a cross sectional view taken along line Id-Id shown in FIG. 1A.

Figure 2A:
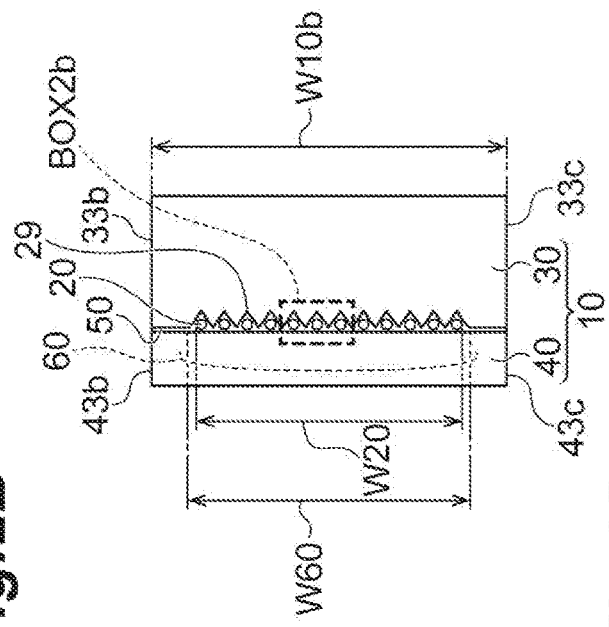
FIG. 2A is a schematic top view showing an optical connecting device according to an example of the embodiment.
Figure 2B:
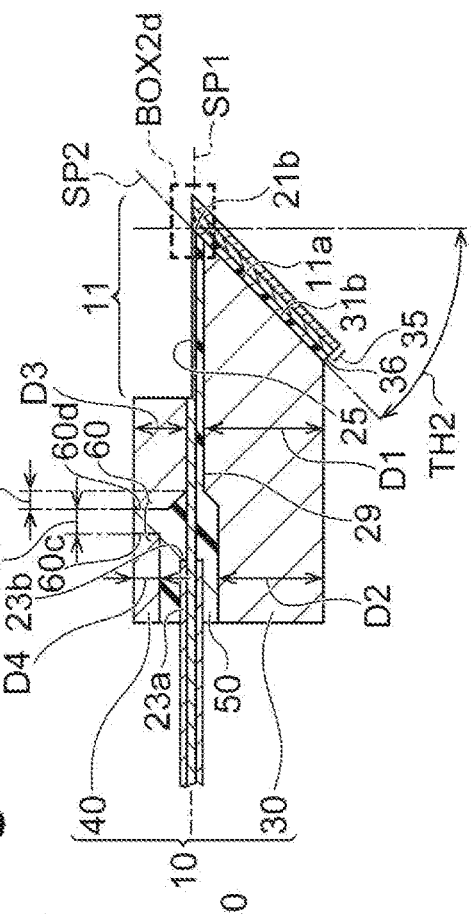
FIG. 2B is a schematic front view showing the optical connecting device according to the example.
Figure 2C:
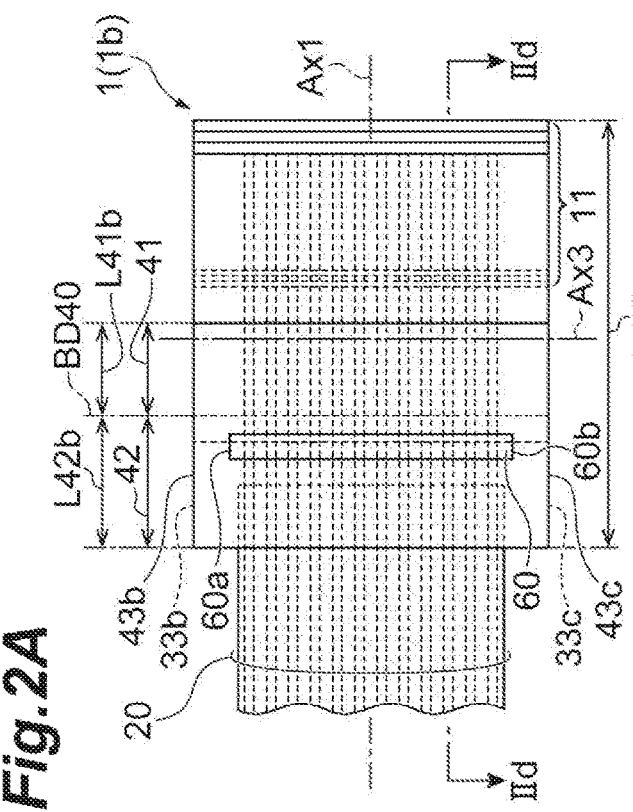
FIG. 2C is a schematic side view showing the optical connecting device according to the example.
Figure 2D:
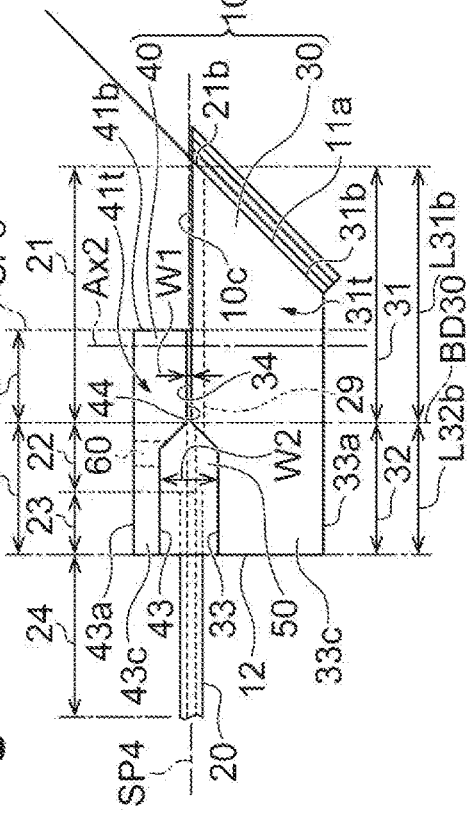
FIG. 2D is a schematic cross sectional view, taken along line IId-IId, showing the optical connecting device according to the example.

FIG. 2A is a schematic plan view showing the optical connecting device according to the embodiment. FIG. 2B is a schematic front view showing the optical connecting device according to the embodiment. FIG. 2C is a schematic side view showing the optical connecting device according to the embodiment. FIG. 2D is a cross sectional view taken along line IId-IId shown in FIG. 2A.

The optical connecting device 1 (1a and 1b) includes a holder part 10 and multiple optical fibers 20. The holder part 10 has a first holder member 30, a second holder member 40, and a resin body 50. The holder part 10 has a first end 11 and a second end 12. The first and second ends 11 and 12 are arranged in the direction of the first axis Ax1, and the first end 11 is opposite to the second end 12. The resin body 50 is disposed between the first and second holder members 30 and 40 to bond these holder members 30 and 40 to each other.

As shown in FIG. 1C and FIG. 2C, the first and second holder members 30 and 40 are arranged in the direction of a second axis Ax2 intersecting the first axis Ax1. The first holder member 30 has a first portion 31 and a second portion 32, which are arranged in the direction of the first axis Ax1, and the second holder member 40 has a first portion 41 and a second portion 42, which are arranged in the direction of the first axis Ax1.

As shown in FIG. 1D and FIG. 2D, one of the first and second holder members 30 and 40 has a through-hole 60, which extends in the direction of the second axis Ax2, in the second portion thereof. Specifically, the through-hole 60 extends in the direction of the second axis Ax2 in either the first holder member 30 or the second holder member 40. In the present embodiment, the through-hole 60 is given to the second holder member 40, which is not limited to the present embodiment.

The first holder member 30 provides the second portion 32 with a first inner face 33, and the second holder member 40 also provides the second portion 42 with a second inner face 43. The first and second inner faces 33 and 43 extend in the direction of the first axis Ax1 along the first reference plane SP1 to reach the second end 12.

As shown in FIG. 1D and FIG. 2D, each of the multiple optical fibers 20 includes a first resin-uncoated fiber portion 21, a second resin-uncoated fiber portion 22, a first resin-coated fiber portion 23 and a second resin-coated fiber portion 24. The first resin-uncoated fiber portion 21 is held by the first portion 31 of the first holder member 30 and the first portion 41 of the second holder member 40, and specifically, the first resin-uncoated fiber portion 21 is disposed between the first portion 31 of the first holder member 30 and the first portion 41 of the second holder member 40 to extend in the direction of the first axis Ax1. The optical fibers are arranged along the first reference plane SP1 between the first portion 31 of the first holder member 30 and the first portion 41 of the second holder member 40. In particular, the first resin-uncoated fiber portion 21 extends between the first portion 31 of the first holder member 30 and the first portion 41 of the second holder member 40. The second resin-uncoated fiber portion 22 and the first resin-coated fiber portion 23 extend between the second portion 32 of the first holder member 30 and the second portion 42 of the second holder member 40. The second resin-coated fiber portion 24 extends outward from the second end 12 of the holder part 10.

The optical connecting device 1 provides the second portion 32 of the first holder member 30 and the second portion 42 of the second holder member 40 with the first and second inner faces 33 and 43, respectively, which extend in the direction of the first axis Ax1 to the end 12 to form a gap between the second portions 32 and 42. The gap is embedded with the resin body 50, which is disposed between the second portion 32 of the first holder member 30 and the second portion 42 of the second holder member 40. The resin body 50 covers the side faces 23a and the end 23b of the coating resin of the first resin-coated fiber portion 23 and the side face 22a of the second resin-uncoated fiber portion 22. The second resin-uncoated fiber portion 22 and the first resin-coated fiber portion 23, which are disposed in the gap, of each optical fiber 20 are held by the resin body 50, which is produced from resin supplied to the gap through the through-hole 60 in the second axis Ax2. The resin body 50 is made from a sufficient amount of resin to fill not only the gap but also the through-hole 60 of the first holder member 30, thereby providing the optical connecting device 1 with a desired mechanical strength.

The first resin-uncoated fiber portion 21 has an end, which belongs to each of the optical fibers 20. The optical fibers 20 have respective fiber ends 21a positioned to the end face of the first end 11. The arrangement of the ends 21a enables the optical fibers 20, held in the optical connecting device 1, to be optically coupled to the arrangement of optical coupling elements, such as grating couplers, in a semiconductor device, such as a silicon photonic device.

Example of the optical connecting device 1

Material of the first holder member 30: glass or ceramic, specifically quartz, Tempax, Pyrex (registered trademark), alumina or zirconia Material of the second holder member 40: glass or ceramic, specifically quartz, Tempax, Pyrex (registered trademark), alumina or zirconia Material of resin for the resin body 50: Diluent, additive, UV curing agent and/or heat curing agent The first holder member 30 has an outer face 33a and a pair of side faces (one side face 33b and the other side face 33c), and the outer face 33a is opposite to the first inner face 33 of the second portion 32. The outer face 33a and the pair of side faces (one side face 33b and the other side face 33c) extend in the direction of the first axis Ax1. The second holder member 40 has an outer face 43a and a pair of side faces (one side face 43b and the other side face 43c), and the outer face 43a is opposite to the second inner face 43 of the second portion 42. The outer face 43a and the pair of side faces (one side face 43b and the other side face 43c) extend in the direction of the first axis Ax1. In the first holder member 30, the outer face 33a extends from the one side face 33b to the other side face 33c, and the first inner face 33 of the second portion 32 extends from the one side face 33b to the other side face 33c. In the second holder member 40, the outer face 43a extends from the one side face 43b to the other side face 43c, and the second inner face 43 extends from the one side face 43b to the other side face 43c.

As described above, the first holder member 30 provides the second portion 32 of the first holder member 30 with the first inner face 33. The first holder member 30 has a third inner face 34 in the first portion 31, and the third inner face 34 is connected to the first inner face 33 of the second portion 32. In the first holder member 30, the third inner face 34 extends from the first end 11 to the boundary BD30 between the first portion 31 and the second portion 32.

As described above, the second holder member 40 provides the second portion 42 with the second inner face 43. Further, the second holder member 40 has a fourth inner face 44 in the first portion 41, and the fourth inner face 44 is connected to the second inner face 43. The fourth inner face 44 is disposed between the first portion 41 and the second portion 42 and extends from the first end 11 to the boundary BD40.

The third and fourth inner faces 34 and 44 extend along the first reference plane SP1, while the first and second inner faces 33 and 43 are arranged away from the first reference plane SP1 and extend in the direction of the first axis Ax1 to reach the second end 12. Specifically, the first holder member 30 is provided with the difference in level between the first inner face 33 and the third inner face 34, which may be equal to or more than 0.1 mm at a far side 60c on the edge of the inner opening of the through-hole 60 (in particular, one of the longer sides of the inner opening is far from the first portion 41). The second holder member 40 is provided with the difference in level between the second inner face 43 and the fourth inner face 44, which may be equal to or more than 0.1 mm at a far side 60c on the edge of the inner opening of the through-hole 60.

The first and second holder members 30 and 40 are arranged such that the first inner face 33 is away from the second inner face 43 by a distance (denoted by W2), which can be equal to or less than 0.1 mm or less at the far end 60c of the inner opening of the through-hole 60, to form the gap. The gap is effective in guiding resin, which flows from the through-hole 60 along the first and second inner faces 33 and 43, to spread over the space between the second portion 32 of the first holder member 30 and the second portion 42 of the second holder member 40.

As shown in FIGS. 1C and 2C, the first inner face 33 is separated away from the second inner face 43 by the second distance W2 in the second portions 32 and 42 of the first and second holder members 30 and 40, while the third inner face 34 is separated away from the fourth inner face 44 by the first distance W1 in the first portions 31 and 41 of the first and second holder members 30 and 40. The second distance W2 is larger than the first distance W1.

The first and second holder members 30 and 40 allows the resin body 50 in the gap between the first and second inner faces 33 and 43, separated by the second distance W2, to hold the second resin-uncoated fiber portion 22 and the first resin-coated fiber portion 23 of each of the optical fibers 20 at the second portions 32 and 42. Specifically, the resin body 50, which makes contact with the entire first and second inner face 33 and 43, the side face of the second resin-uncoated fiber portion 22 and the side face of the first resin-coated fiber portion 23 to bond the first and second holder members 30 and 40 with each other, brings a desired mechanical strength to the first and second holder members 30 and 40 thus bonded.

At least one of the first and second holder members 30 and 40, for example, the first holder member 30 in the present example has support grooves 29, which can support the optical fibers 20, in the first portion 31. Specifically, the support grooves 29 extend in the direction of the first axis Ax1 in the third inner face 34. The optical fibers 20 in the support grooves 29 are positioned to the support groove 29 by the fourth inner face 44 of the second holder member 40, so that the optical fibers 20 are arranged in a width W20 on the third inner face 34 of the first holder member 30.

As shown in FIGS. 1D and 2D, the through-hole 60, which is disposed in, for example, the second portion 42 of the second holder member 40, extends from the outer face 43a to the second inner face 43 in the direction of the second axis Ax2. Further, the through-hole 60 has one end 60a and the other end 60b, which are away from the respective side faces (one side face 43b and the other side face 43c) of the second holder member 40, and runs in the direction of the third axis Ax3 in the second portion 42. The through-hole 60 has an outer opening at the outer face 43a of the second portion 42 and an inner opening at the second inner face 43 of the second portion 42. The outer opening has a length L60 and a width W60, and extends in the direction of the second axis Ax2. The length L60 is defined as a distance taken in the direction of the first axis Ax1 and the width W60 is defined as a distance taken in the direction of the third axis Ax3.

The length L60 ranges, for example, from 0.2 to 0.5 mm. The length L60 smaller than 0.2 mm may cause the resin to overflow from the through-hole 60. The length L60 larger than 0.5 mm makes the volume of the resin in the through-hole 60 large, leading to a large thermal expansion to generate a thermal stress that may break the optical connecting device 1.

The width W60 of the opening is larger than the width W20 of the array of the optical fibers 20, and the through-hole 60 may be provided with the one end 60a and the other end 60b, which are located outside the respective sides of the array of fibers 20, in one of the first portions 31 and 41 of the first and second holder members 30 and 40. In particular, the one end 60a and the other end 60b of the through-hole 60 are away from the respective sides of the array of optical fibers 20 by a distance of, for example, 0.1 to 1.0 mm to reduce the possibility of unwanted protrusion of resin.

The first portion 41 of the second holder member 40 is away from the near side 60d of the inner opening of the through-hole 60 (in particular, one of the longer sides of the inner opening is closer to the first portion 41) by a distance Ld. In the example, the distance Ld can be, for example, equal to or less than 0.5 mm, allowing the resin to flow both the first portions (31 and 41) and the second portions (32 and 42). A large distance Ld may prevent the resin from flowing to the first portions (31 and 41).

The optical fibers 20 are supported by the second portion 32 of the first holder member 30 and the second portion 42 of the second holder member 40 so as to be arranged along the first reference plane SP1 therebetween and are, in particular, held by the resin body 50 disposed between the second portions 32 and 42. The resin body 50 separates the coating resin of the optical fibers 20 from the second portions 32 and 42 of the first and second holder members 30 and 40.

The first holder member 30 provides the first portion 31 with a length larger than that of the second portion 32 of the first holder member 30. In the first holder member 30, the second portion 32 shorter than the first portion 31 in length allows the optical connecting device 1 to have a desired mechanical property.

An exemplary first holder member 30
Length L31a of the first portion 31; 2.0 to 4.0 mm
Length L32a of the second portion 32: 0.5 to 1.0 mm As shown in FIGS. 1C and 2C, the first holder member 30 has a thick portion 31t in the first portion 31, and the portion 31t is thicker than the second portion 32 of the first holder member 30. In the present embodiment, the first holder member 30 provides the first portion 31 and the second portion 32 with a first thickness D1 and a second thickness D2, respectively.

An exemplary first holder member 30
First thickness D1: 1.0 to 2.0 mm
Second thickness D2: 0.8 to 1.8 mm As shown in FIGS. 1C and 2C, the second holder member 40 has a thick portion 41t in the first portion 41, and the portion 41t is thicker than the second portion 42 of the second holder member 40. In the present embodiment, the second holder member 40 provides the first portion 41 and the second portion 42 with a third thickness D3 and a fourth thickness D4, respectively.

Third thickness D3: 0.5 to 1.0 mm
Fourth thickness D4: 0.3 to 0.8 mm

Referring to FIGS. 1D and 2D, the through-hole 60 is located in the second portion 42 of the second holder member 40. The thin second holder member 40 makes the through-holes 60 short and the short through-holes 60 allows resin to flow into a slight gap between the first and second holder members 30 and 40.

A description will be given of the optical connecting device 1a with reference to FIGS. 1A to 1D. The first portion 41 of the second holder member 40 may be longer than the second portion 42 of the second holder member 40. The first portion 41 of the second holder member 40 has a length L41a of, for example, 2.0 to 4.0 mm, and the second portion 42 of the second holder member 40 has a length L42a of, for example, 0.5 to 1.0 mm. Making the second portion 42 shorter than the first portion 41 in the second holder member 40 can enhance the mechanical strength of the optical connecting device 1.

As shown in FIGS. 1C and 1D, the first end 11 has an end face 11a. The end face 11a is given by the first holder member 30, the second holder member 40, and the resin body 50 therebetween. The end face 11a extends along a second reference plane SP2 that is inclined at a first angle TH1 with respect to the first reference plane SP1. The first angle TH1 can be an acute angle, which ranges, for example, from 0 to 10 degrees in the optical connecting device 1a. In the present embodiment, the first and second holder members 30 and 40 have an end face 31a and an end face 41a, respectively. The first end 11 is provided with the end 21a, the end face 31a and the end face 41a and extends to connect the outer face 33a of the first holder member 30 to the outer face 43a of the second holder member 40.

Figure 3A:
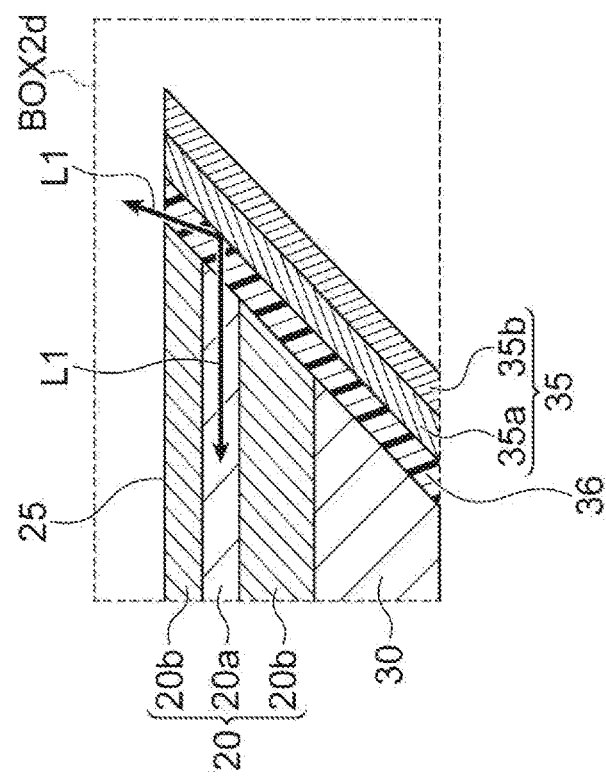
FIG. 3A is a schematic enlarged view showing an area indicated by dash line BOX2b shown in FIG. 2B.
Figure 3B:
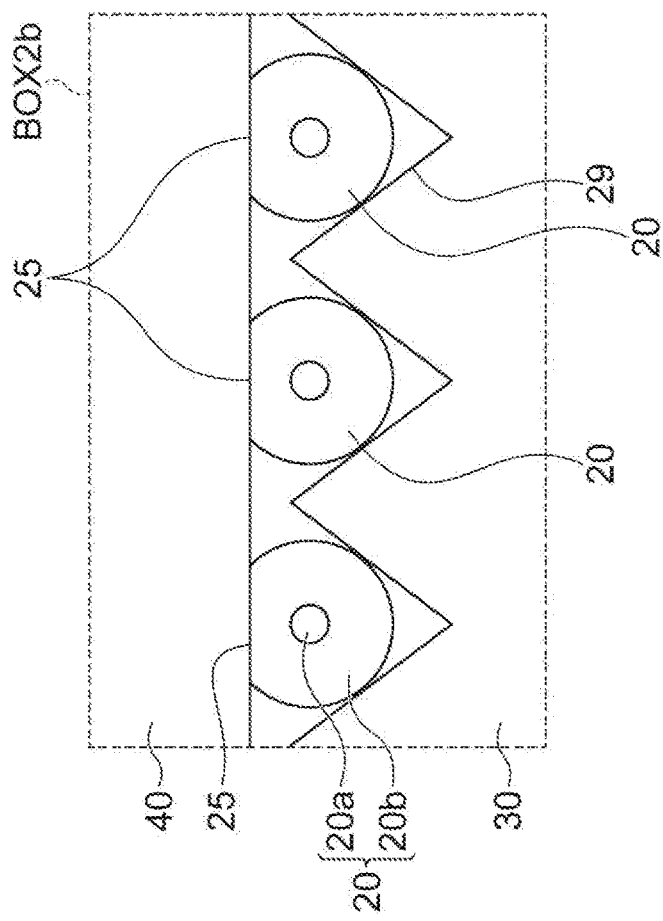
FIG. 3B is a schematic enlarged view showing an area indicated by dash line BOX2d shown in FIG. 2D.

An exemplary optical connecting device 1a
Holder length L10a: 2.5 to 5.0 mm
Holder width W10a: 2.0 to 6.0 mm
First holder member 30
Length L31a of the first portion 31: 2.0 to 4.0 mm
Length L32a of the second portion 32: 0.5 to 1.0 mm
Second holder member 40
Length L41a of the first portion 41: 2.0 to 4.0 mm
Length L42a of the second portion 42: 0.5 to 1.0 mm FIG. 3A is an enlarged view showing an area indicated by the broken line BOX 2b shown in FIG. 2B. FIG. 3B is an enlarged view showing an area indicated by the broken line BOX 2d shown in FIG. 2D. A description will be given of the optical connecting device 1b with reference to FIGS. 2A to 2D and FIGS. 3A and 3B.

As shown in FIG. 2D, the first holder member 30 has an end face 31b, which extends along the second reference plane SP2. The second reference plane SP2 is inclined at a second angle TH2 with respect to the first reference plane SP1. The second angle TH2 can be, for example, an acute angle, which ranges, for example, from 35 to 55 degrees.

As shown in FIGS. 2A to 2D, the first holder member 30 is provided with an end face 11a, extending along the second reference plane SP2 in the first portion 31, in the optical connecting device 1b. The second holder member 40 has an end face 41b, extending along the third reference plane SP3 in the direction of the second axis Ax2 and intersecting the first reference plane SP1, in the first portion 41. The holder part 10 has a face 10c, which extends along a fourth reference plane SP4 that is inclined at an acute angle with the second reference plane SP2, and the face 10c connects the end face 31b of the first holder member 30 to the end face 41b of the second holder member 40. The holder part 10 provides the first resin-uncoated fiber portion 21 with an end face 21b extending along the second reference plane SP2 and a cladding face 25 extending along the fourth reference plane SP4.

The optical connecting device 1b has a reflecting member 35 on the end face 31b of the first holder member 30, and the reflecting member 35 enables incidence to and/or emission from the optical fiber 20 by reflection. The reflecting member 35 is bonded to the first holder member 30 by an adhesive member 36. Specifically, the reflecting member 35 includes a reflective film 35a and a support 35b mounting the reflective film 35a. The adhesive member 36 contains resin, for example, made from a diluent, an additive, and an ultraviolet curing agent and/or a thermal curing agent. The reflective film 35a includes, for example, metal or dielectric material, such as, Au, Ag, Al, titanium oxide, silicon oxide, niobium oxide, tantalum oxide or magnesium fluoride. The support 35b includes, for example, glass or ceramic, such as, quartz, Tempacs, Pyrex (registered trademark), alumina or zirconia.

An exemplary optical connecting device 1b
Holder length L10b: 5.0 mm or less
Holder width W10b: 6.0 mm or less
Length L31b of the first portion 31: 3.0 to 4.0 mm
Length L32b of the second portion 32: 0.5 to 1.0 mm
Length L41b of the first portion 41: 0.5 to 2.0 mm
Length L42b of the second portion 42: 0.5 to 1.0 mm In the optical connecting device 1, each of the optical fibers 20 can be, for example, a single mode fiber, and the single mode fiber includes a single core 20a and a cladding 20b surrounding the core 20a.

Figure 4A:
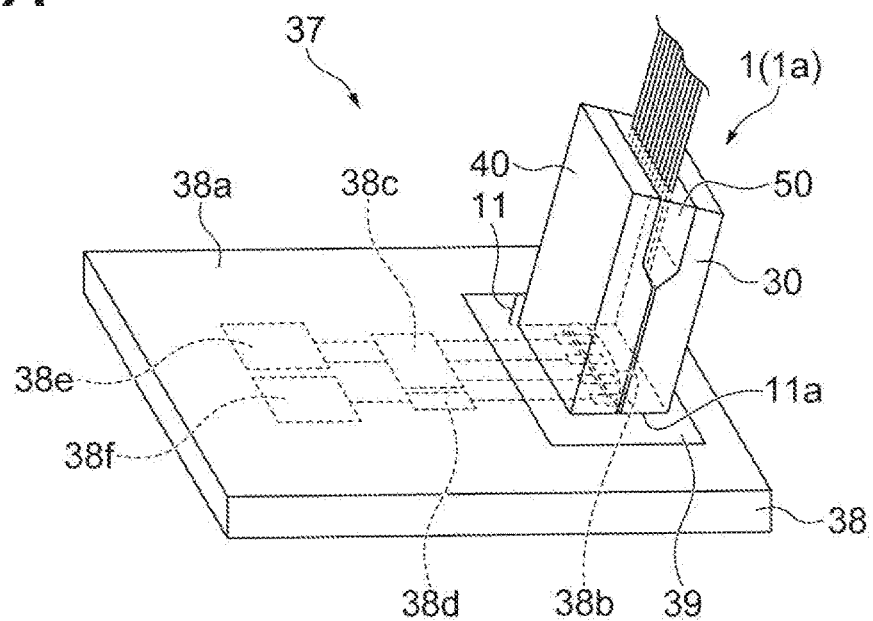
FIG. 4A is a schematic view showing a silicon photonic integrated device and an optical connecting device coupled to the silicon photonic integrated device.
Figure 4B:
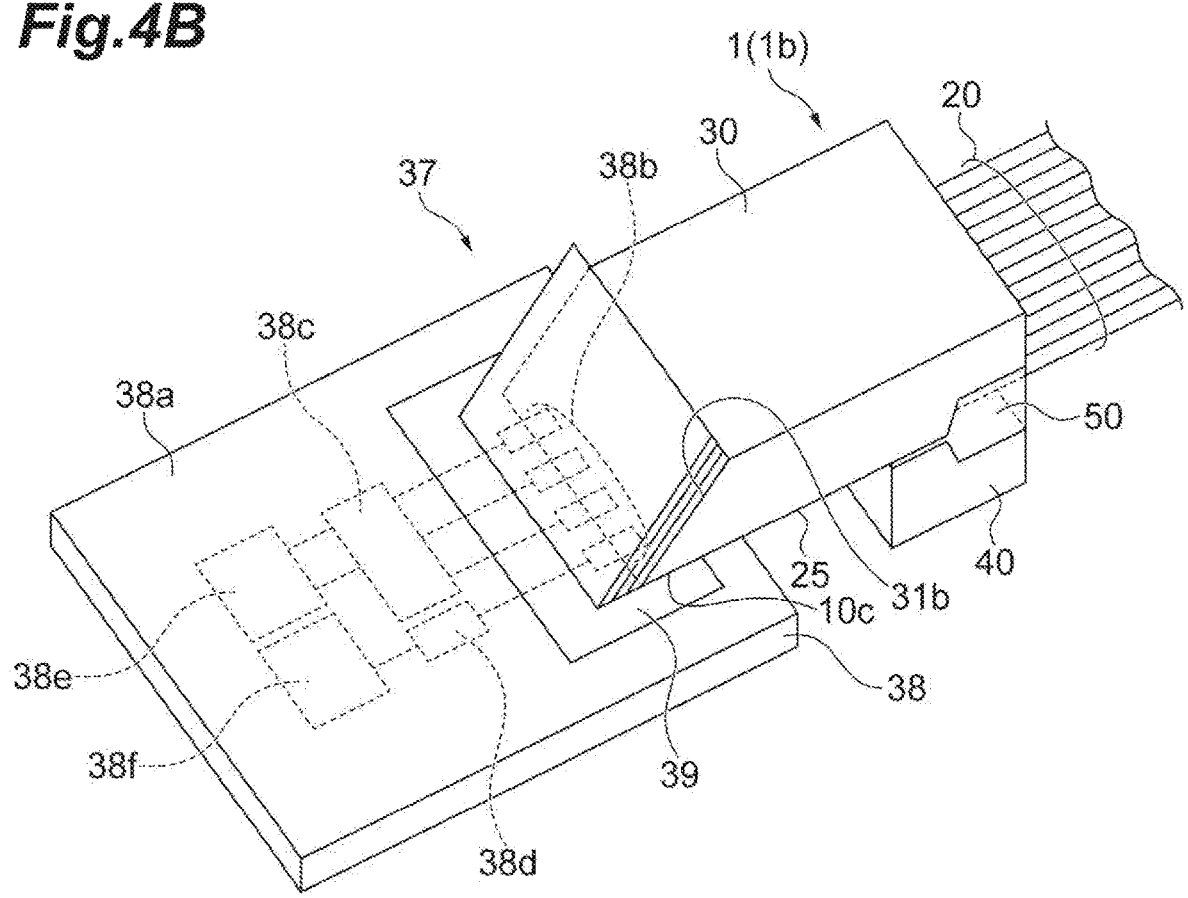
FIG. 4B is a schematic view showing a silicon photonic integrated device and another optical connecting device coupled to the silicon photonic integrated device.

FIG. 4A is a schematic view showing a silicon photonic integrated device and an optical connecting device coupled to the silicon photonic integrated device. FIG. 4B is a schematic view showing a silicon photonic integrated device and another optical connecting device coupled to the silicon photonic integrated device. The optical connecting device 37 includes an optical connecting device 1, a semiconductor optical device 38, and an adhesive member 39. The semiconductor optical device 38 includes an array of optical coupling elements 38b, such as optical couplers, and the optical coupling elements 38b are connected via semiconductor optical waveguides to the optical modulator 38c and the light receiving elements 38d in the semiconductor optical device. The optical modulator 38c is connected to an electronic circuit 38e, such as a driver circuit, in the semiconductor optical device 38 via electrical interconnects of the semiconductor optical device 38. The light receiving elements 38d are connected to an electronic circuit 38f, such as a signal amplifying circuit 38g, in the semiconductor optical device 38 via electrical interconnects of the semiconductor optical device 38. The optical connecting device 1 is bonded to the principal face 38a of the semiconductor optical device 38 by the adhesive member 39, and the optical fibers 20 of the optical connecting device 1 are coupled to the optical coupling elements 38b of the semiconductor optical device 38.

Referring to FIG. 4A, the optical connecting device 1b is positioned to an array of the photo-couplers of the silicon photonic device and optically coupled to the silicon photonic device at the end face 11a. The end face 11a that extends along the second reference plane SP2 can optically couple the arrayed optical fibers 20, held by the holder part 10 and arranged along the first reference plane SP1, to the arrayed light coupling elements in the silicon photonic device.

Referring to FIG. 4B, the optical connecting device 1b is positioned to the arrayed photo-couplers in the silicon photonic device and optically coupled to the silicon photonic device at the face 10c. The end faces 31b and the cladding faces 25 that extend along the second and fourth reference planes SP2 and SP4, respectively, can optically couple the arrayed optical fibers 20, which extend along the second reference plane SP2 in the holder part 10, to the arrayed optical couplers in the silicon photonic device.

A description will be given of major steps in the method for fabricating the optical connecting device with reference to FIGS. 5A and 5B, FIGS. 6A and 6B, FIGS. 7A and 7B, and FIGS. 9A and 9C. For ease of understanding, where possible, reference numerals in the description with reference to FIGS. 1A to 1D, FIGS. 2A to 2D, FIGS. 3A and 3B, and FIGS. 4A and 4B will be used in the following description.

Figure 5B:
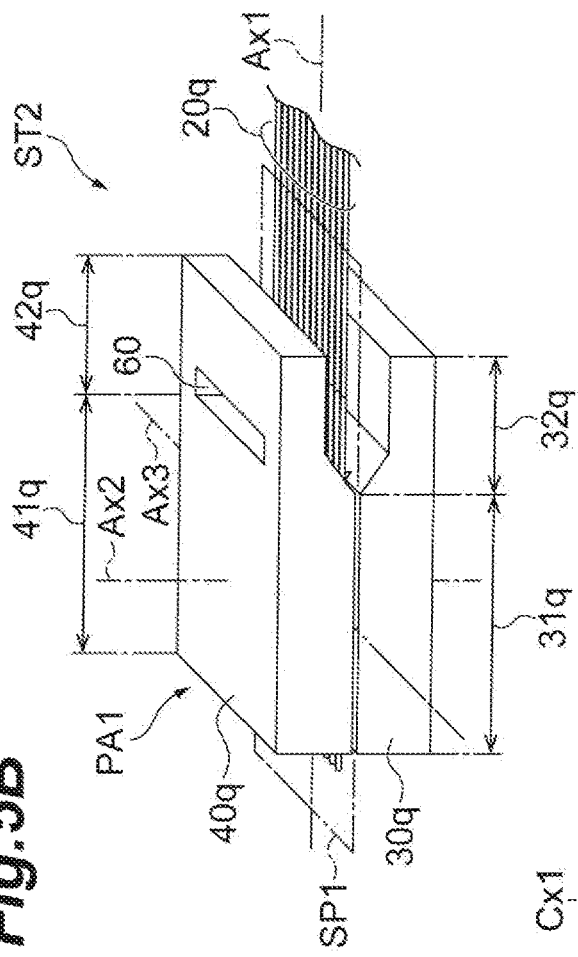
FIG. 5B is a schematic view showing a major step in the method according to the example of the embodiment.
Figure 5A:
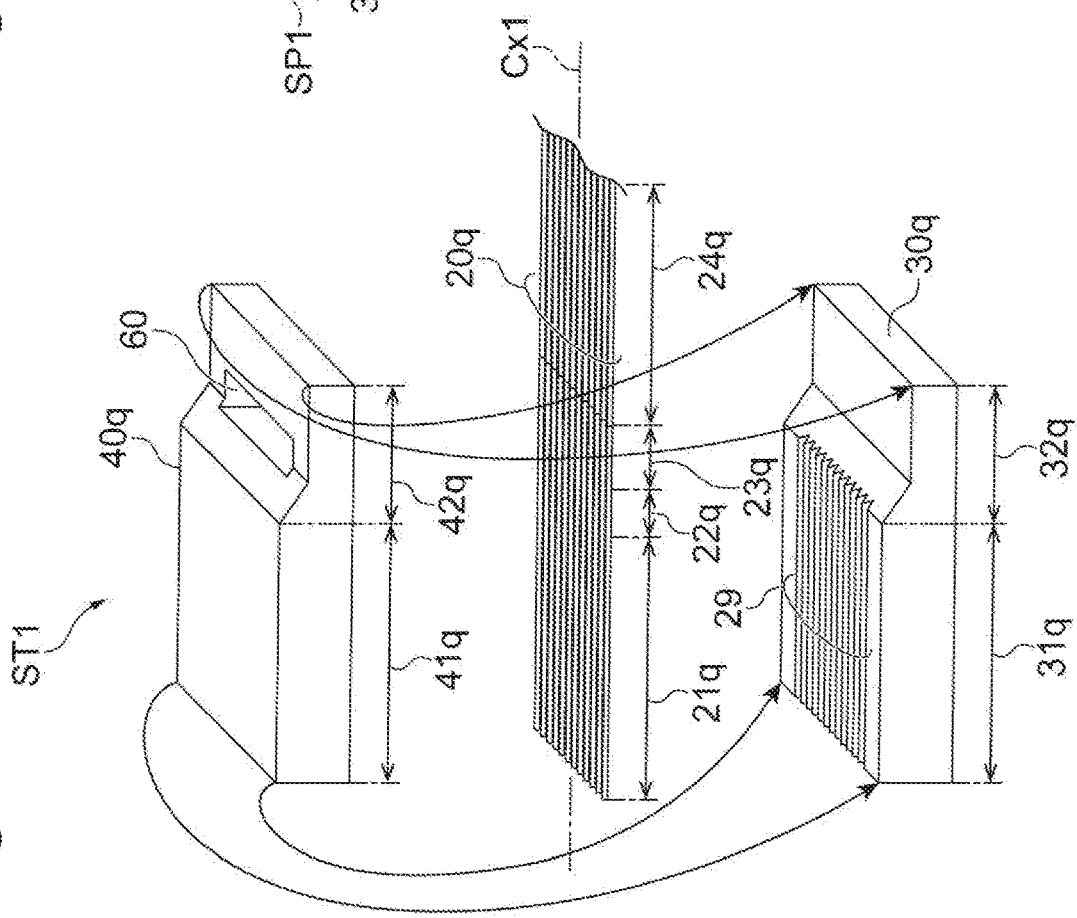
FIG. 5A is a schematic view showing a major step in a method for fabricating an optical connecting device according to an example of the embodiment.

The method includes a step ST1, as shown in FIG. 5A, for preparing a first holder component 30q, a second holder component 40q, and multiple optical fibers 20q. Each of the optical fibers 20q includes a first resin-uncoated fiber portion 21q, a second resin-uncoated fiber portion 22q, a first resin-coated fiber portion 23q, and a second resin-coated fiber portion 24q, which extend in the direction of the waveguide axis Cx1. The first holder component 30q has a first portion 31q and a second portion 32q. The second holder component 40q has a first portion 41q and a second portion 42q. The second portion of one of the first and second holder components 30q and 40q has a through-hole 60, and the through-hole 60 extends in the direction of the second axis Ax2 that intersects the first axis Ax1 and the first reference plane. In the present embodiment, the through-hole 60 is disposed in the second portion 42q of the second holder component 40q. Alternatively, the through-hole 60 can be given to the second portion 32q of the first holder component 30q.

Specifically, the first and second holder components 30q and 40q are prepared for the first and second holder members 30 and 40, respectively. As seen from the first and second holder members 30 and 40, the first holder component 30q has a first portion 31q and a second portion 32q, which are associated with the first and second portions 31 and 32, respectively, and the second holder component 40q has a first portion 41q and a second portion 42q, which are associated with the first and second portions 41 and 42. The first and second holder components 30q and 40q are provided with respective structures, which can be understood from the description on the first and second holder members 30 and 40.

The method includes a step ST2, as shown in FIG. 5A, for producing a preliminary assembly PA1 from the first and second holder components 30q and 40q and the optical fibers 20q. Specifically, the optical fibers 20q, the first and second holder components 30q and 40q are arranged such that the following conditions are satisfied.

Conditions

The first resin-uncoated fiber portion 21q is disposed between the first and second holder components 30q and 40q, in particular at the first portions 31q and 41q.

The second resin-uncoated fiber portion 22q and the first resin-coated fiber portion 23q are disposed between the second portions 32q and 42q of the first and second holder components 30q and 40q and extend in the gap therebetween.

The second resin-coated fiber portion 24q extends outward from in the gap, which will be filled with the resin.

In the preliminary assembly PA1, the first holder component 30q is provided with the first and second portions 31q and 32q, which are arranged in the direction of the first axis Ax1, and the second holder component 40q is provided with the first and second portions 41q and 42q, which are arranged in the direction of the first axis Ax1. The optical fibers 20q, specifically the first resin-uncoated fiber portion 21q in each of the optical fibers 20q, are arranged along the first reference plane SP1 between the first portions 31q and 41q of the first and second holder components 30q and 40q, and the first resin-uncoated fiber portion 21q extends in the direction of the first axis Ax1 therebetween.

The method includes a step ST3, as shown in FIG. 6A, for supplying resin 50r to the preliminary assembly PA1. The through-hole 60 is utilized to supply the resin 50r to the gap between the first and second holder components 30q and 40q therethrough. Specifically, the resin 50r is provided with a viscosity enough to enable capillarity in gaps between the first portions 31q and 41q of the first and second holder components 30q and 40q, and between the second portions 32q and 42q of the first and second holder components 30q and 40q, thereby entering the gaps. Resin having such a viscosity is prepared using organic solvents. The inventors' research reveals that the resin 50r to be supplied through the through-hole 60 preferably has a low viscosity and fills the gaps, the sizes of which are different from each other (specifically, the gap between the first portions 31q and 41q of the first and second holder components 30q and 40q is smaller than the gap between the second portions 32q and 42q of the first and second holder components 30q and 40q, to cover the optical fibers 20q. The resin 50r contains, for example, a diluent, an additive, and an ultraviolet curing agent and/or a thermal curing agent.

Viscosity: 1000 milli-pascal second or less, for example 400 milli-pascal second The through-hole 60 is disposed in the second portion 42q of the second holder component 40q, and the distance D10 between the second end 12 and the far end 60c of the outer opening is greater than larger than the distance D11 between the near end 60d of the outer opening of the through-hole 60 and the boundary BD40, which is located between the first and second portions 41q and 42q of the second holder component 40q. The supplying of the resin 50r to the through-hole 60 follows aligning a resin supplying tool 65, such as a nozzle, with the outer opening of the through-hole 60, which has a high aspect ratio.

The first and second holder components 30q and 40q are provided with a first inner face 33q and a second inner face 43q, respectively, at the second portions 32q and 42q. The first and second inner faces 33q and 43q extend along the first axis Ax1 to the second end 12q and extend along the third axis Ax3 in the directions associated with to opposite sides of each of the first and second holder components 30q and 40q. In the present embodiment, the resin 50r is located between the first and second inner faces 33q and 43q of the first and second holder components 30q and 40q to fill one gap between the second portions 32 and 42q and is located between the third and fourth inner faces 34q and 44q of the first and second holder components 30q and 40q to fill another gap between the first portions 31 and 41q.

The first and second holder components 30q and 40q have first and second slope faces 30a and 40a in the second portions 32q and 42q, respectively. The first slope face 30a extends from the boundary between the first portion 31q and the second portion 32q in the direction from the boundary to the second end 12. The second slope face 40a extends from the boundary between the first portion 41q and the second portion 42q in the direction from the boundary to the second end 12. The first slope face 30a is separated away from the second slope face 40a by a distance, which monotonously changes from the first distance W1 to the second distance W2 in the direction from the first end 11 to the second end 12. These slope faces allow the resin, which comes from the through-hole 60, to flow along both the first portions (31q and 41q) and the second portions (32q and 42q).

The through-hole 60 is positioned such that at least a part of the inner opening thereof is located in one of the slope faces. This positioning allows the through-hole 60 to supply resin to the first portions (31q and 41q) and the second portions (32q and 42q).

The first and second slope faces 30a and 40a are also provided in the first and second holder members 30 and 40.

The method includes a step ST4, as shown in FIG. 6B, for curing the resin 50r to form an assembly AS1. Specifically, force F is applied to the resin 50r across the first and second holder components 30q and 40q and then a curing process, such as heating and/or ultraviolet irradiation, is applied thereto to produce, from the resin 50r, a resin body 50q which bonds the optical fibers 20q and the first and second holder components 30q and 40q with each other, thereby forming the assembly AS1. The assembly AS1 is provided with the optical fibers 20q, the first and second holder components 30q and 40q, and the resin body 50q. The assembly AS1 allows the second resin-uncoated fiber portion 22q and the first resin-coated fiber portion 23q to be separated away from the first and second inner faces 33q and 43q at the second portions 32q and 42 of the first and second holder components 30q and 40q. This separation allows the optical fibers 20q to extend outward from the resin body 50q of the temporary assembly PA1.

As describe above, the method for making the optical connecting device includes a step for supplying resin to the gap, which is formed between the first and second inner faces 33q and 43 of the second portions 32q and 42q, through the through-hole 60 in one of the first and second holder components 30q and 40q, for example, the second holder component 40q. This supplying of resin allows the resin 50r at the second portions 32q and 42q to make contact with the entire first and second inner faces 33q and 43q of the first and second holder components 30q and 40q. The resin 50r can spread over the gap. The cured resin 50r (referred to as the resin body 50q) fills the gap to bring the assembly the mechanical strength required for subsequent processes and usage.

Figure 7A:
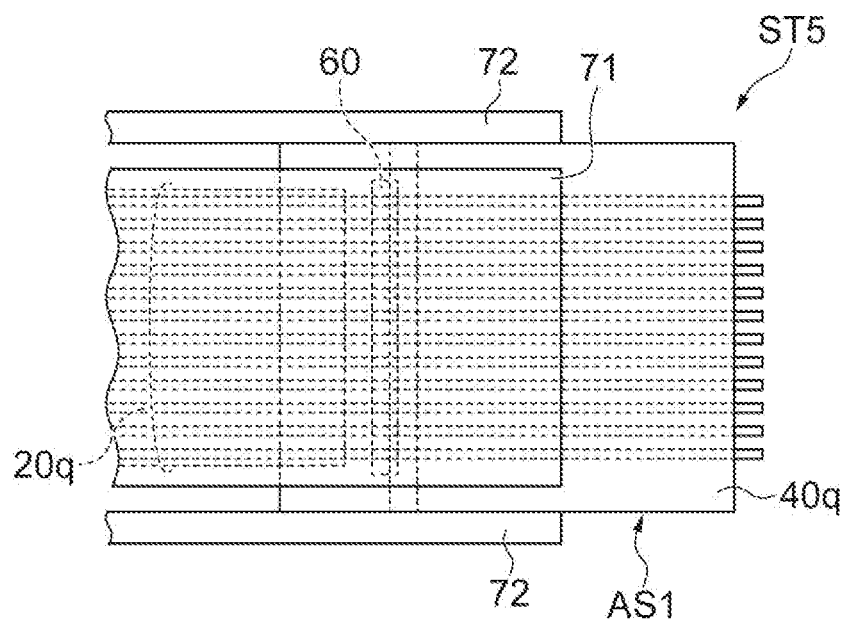
FIG. 7A is a schematic view showing a major step in the method according to the example of the embodiment.
Figure 7B:
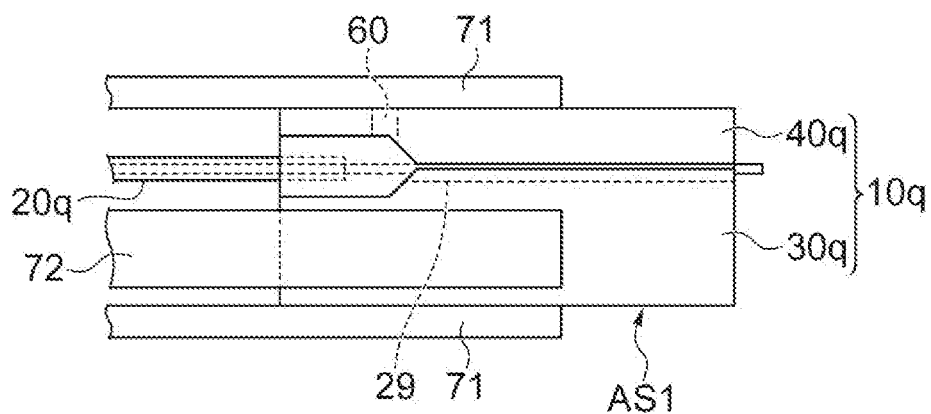
FIG. 7B is a schematic view showing a major step in the method according to the example of the embodiment.

The method further includes a step ST5, as shown in FIGS. 7A and 7B, for fixing the assembly AS1 to a first holding tool 71, which is used in the subsequent polishing process. The assembly AS1 may be held by a second holding tool 72 at the sides thereof.

The method includes a step ST6, as shown in FIGS. 8A, 8B and 8C, for polishing the assembly AS1, which is held by the first and second holding tools 71 and 72, with a polisher 73. The polisher 73 is used to polish the assembly AS1 at the end face ASF thereof Referring to FIG. 8A, the first tool 71 applies fastening force to the assembly AS1 in contact with the upper and lower faces of the assembly AS1, specifically both not only the second portion 32q of the first holder component 30q but also a part of the first portion 31q thereof and not only the second portion 42q of the second holder component 40q but also a part of the first portion 41q thereof. The first holder component 30q is provided with the second portion 32q as well as the first portion 31q and the second holder component 40q is provided with the second portion 42q as well as the first portion 41q. The second portions 32q and 42q of the first and second holder components 30q and 40q give the assembly AS1 a desired mechanical strength. The assembly AS1 can receive the fastening force at both the first and second portions 31q and 32q and the first and second portions 41q and 42q.

Further, the second tool 72 makes contact with opposite side faces of the assembly AS1, specifically not only the second portion 32q of the first holder component 30q but also a part of the first portion 31q thereof to apply fastening force to the assembly AS1. The second tool 72 may not make contact with the first and second portions 41q and 42q of the second holder component 40q.

The first and second tools 71 and 72 apply their respective fastening forces to the assembly AS1 to hold the assembly AS1.

As shown in FIG. 8B, the polisher 73 is positioned and oriented to the assembly AS1 to form a first angle TH1 with respect to the reference plane RF orthogonal to the first axis Ax1. The assembly AS1 is polished with the polisher 73. This polishing is followed by removing the first and second tools 71 and 72. The above processes bring the optical connecting device 1 to completion as shown in FIG. 8C.

If necessary, the present method may include a machining process for holding the assembly AS1 with a tool similar to the first and second tools, which can also apply fastening force to the assembly AS1, to fabricate end faces that extend along the third reference plane SP3 and the fourth reference plane SP4 shown in FIG. 2C.

As described above, the present embodiment provides an optical connecting device with a structure that enables a desired mechanical strength, and provides a method of making the same.

Having described and illustrated the principle of the invention in a preferred embodiment thereof, it is appreciated by those having skill in the art that the invention can be modified in arrangement and detail without departing from such principles. We therefore claim all modifications and variations coining within the spirit and scope of the following claims.

What is claimed is:

1. An optical connecting device comprising:
a holder part having a first end and a second end, the first end being opposite to the second end, the holder part including a first holder member, a second holder member, and a resin body, the first holder member having a first portion and a second portion, the first portion and the second portion of the first holder member being arranged in a direction of a first axis, the second holder member having a first portion and a second portion, the first portion and the second portion of the second holder member being arranged in the direction of the first axis, and the resin body bonding the first holder member to the second holder member; and
multiple optical fibers each having a first resin-uncoated fiber portion, a second resin-uncoated fiber portion, a first resin-coated fiber portion, and a second resin-coated fiber portion, the first resin-uncoated fiber portion being disposed between the first portion of the first holder member and the first portion of the second holder member so as to extend in the direction of the first axis, the second resin-uncoated fiber portion and the first resin-coated fiber portion being disposed between the second portion of the first holder member and the second portion of the second holder member, the second resin-coated fiber portion being disposed outside of the first holder member and the second holder member, and the multiple optical fibers being arranged along a first reference plane between the first portion of the first holder member and the first portion of the second holder member,
the first holder member and the second holder member being arranged in a direction of a second axis intersecting the first axis,
the first portion of the first holder member having a length greater than a length of the second portion of the first holder member,
one of the second portion of the first holder member and the second portion of the second holder member having a through-hole,
the through-hole extending in the direction of the second axis,
the first holder member providing a first inner face in the second portion thereof,
the second holder member providing a second inner face in the second portion thereof,
the first inner face of the second portion of the first holder member and the second inner face of the second portion of the second holder member extending in the direction of the first axis to the second end, and
the resin body being disposed between the first portion of the first holder member and the first portion of the second holder member, between the second portion of the first holder member and the second portion of the second holder member, and in the through-hole.

2. The optical connecting device according to claim 1, wherein
the first holder member provides a first inner face in the first portion thereof,
the second holder member provides a second inner face in the first portion thereof,
the first inner face of the first portion of the first holder member and the second inner face of the first portion of the second holder member extend in the direction of the first axis,
an interval between the first inner face of the second portion of the first holder member and the second inner face of the second portion of the second holder member is greater than that between the first inner face of the first portion of the first holder member and the second inner face of the first portion of the second holder member.

3. The optical connecting device according to claim 1, wherein the first portion of the first holder member includes a part having a thickness greater than that of the second portion of the first holder member.

4. The optical connecting device according to claim 1, wherein the first resin-uncoated fiber portion has an end at the first end of the holder part.

5. The optical connecting device according to claim 1, wherein the first end of the holder part has an end face extending along a second reference plane inclined at an acute angle with respect to the first reference plane.

6. The optical connecting device according to claim 1, wherein
the first holder member has an end face in the first portion thereof,
the end face of the first holder member extends along a second reference plane inclined at an acute angle with respect to the first reference plane at the first end,
the second holder member has an end face in the first portion thereof,
the end face of the second holder member extends along a third reference plane extending in the direction of the second axis, and,
the holder part has a face extending along a fourth reference plane inclined at an acute angle with respect to the second reference plane such that the face of the holder part is disposed between the end face of the first holder member and the end face of the second holder member,
the first resin-uncoated fiber portion has an end face and a cladding face, and
the end face of the first resin-uncoated fiber portion extends along the second reference plane and the cladding face of the first resin-uncoated fiber portion extends along the fourth reference plane.

7. An optical connecting device comprising:
a holder part having a first end and a second end, the first end being opposite to the second end, the holder part including a first holder member, a second holder member, and a resin body, the first holder member having a first portion and a second portion, the first portion and the second portion of the first holder member being arranged in a direction of a first axis, the second holder member having a first portion and a second portion, the first portion and the second portion of the second holder member being arranged in the direction of the first axis, and the resin body bonding the first holder member to the second holder member; and
multiple optical fibers each having a first resin-uncoated fiber portion, a second resin-uncoated fiber portion, a first resin-coated fiber portion, and a second resin-coated fiber portion, the first resin-uncoated fiber portion being disposed between the first portion of the first holder member and the first portion of the second holder member so as to extend in the direction of the first axis, the second resin-uncoated fiber portion and the first resin-coated fiber portion being disposed between the second portion of the first holder member and the second portion of the second holder member, the second resin-coated fiber portion being disposed outside of the first holder member and the second holder member, and the multiple optical fibers being arranged along a first reference plane between the first portion of the first holder member and the first portion of the second holder member,
the first holder member and the second holder member being arranged in a direction of a second axis intersecting the first axis,
the first portion of the first holder member including a part having a thickness greater than that of the second portion of the first holder member,
one of the second portion of the first holder member and the second portion of the second holder member having a through-hole,
the through-hole extending in the direction of the second axis,
the first holder member providing a first inner face in the second portion thereof,
the second holder member providing a second inner face in the second portion thereof,
the first inner face of the second portion of the first holder member and the second inner face of the second portion of the second holder member extending in the direction of the first axis to the second end, and
the resin body being disposed between the first portion of the first holder member and the first portion of the second holder member, between the second portion of the first holder member and the second portion of the second holder member, and in the through-hole.

8. The optical connecting device according to claim 7, wherein
the first holder member provides a first inner face in the first portion thereof,
the second holder member provides a second inner face in the first portion thereof,
the first inner face of the first portion of the first holder member and the second inner face of the first portion of the second holder member extend in the direction of the first axis,
an interval between the first inner face of the second portion of the first holder member and the second inner face of the second portion of the second holder member is greater than that between the first inner face of the first portion of the first holder member and the second inner face of the first portion of the second holder member.

9. The optical connecting device according to claim 7, wherein the first resin-uncoated fiber portion has an end at the first end of the holder part.

10. The optical connecting device according to claim 7, wherein the first end of the holder part has an end face extending along a second reference plane inclined at an acute angle with respect to the first reference plane.

11. The optical connecting device according to claim 7, wherein
the first holder member has an end face in the first portion thereof,
the end face of the first holder member extends along a second reference plane inclined at an acute angle with respect to the first reference plane at the first end,
the second holder member has an end face in the first portion thereof,
the end face of the second holder member extends along a third reference plane extending in the direction of the second axis, and,
the holder part has a face extending along a fourth reference plane inclined at an acute angle with respect to the second reference plane such that the face of the holder part is disposed between the end face of the first holder member and the end face of the second holder member,
the first resin-uncoated fiber portion has an end face and a cladding face, and
the end face of the first resin-uncoated fiber portion extends along the second reference plane and the cladding face of the first resin-uncoated fiber portion extends along the fourth reference plane.

12. An optical connecting device comprising:
a holder part having a first end and a second end, the first end being opposite to the second end, the holder part including a first holder member, a second holder member, and a resin body, the first holder member having a first portion and a second portion, the first portion and the second portion of the first holder member being arranged in a direction of a first axis, the second holder member having a first portion and a second portion, the first portion and the second portion of the second holder member being arranged in the direction of the first axis, and the resin body bonding the first holder member to the second holder member; and multiple optical fibers each having a first resin-uncoated fiber portion, a second resin-uncoated fiber portion, a first resin-coated fiber portion, and a second resin-coated fiber portion, the first resin-uncoated fiber portion being disposed between the first portion of the first holder member and the first portion of the second holder member so as to extend in the direction of the first axis, the second resin-uncoated fiber portion and the first resin-coated fiber portion being disposed between the second portion of the first holder member and the second portion of the second holder member, the second resin-coated fiber portion being disposed outside of the first holder member and the second holder member, and the multiple optical fibers being arranged along a first reference plane between the first portion of the first holder member and the first portion of the second holder member, the first end of the holder part having an end face extending along a second reference plane inclined at an acute angle with respect to the first reference plane, the first holder member and the second holder member being arranged in a direction of a second axis intersecting the first axis, one of the second portion of the first holder member and the second portion of the second holder member having a through-hole, the through-hole extending in the direction of the second axis, the first holder member providing a first inner face in the second portion thereof, the second holder member providing a second inner face in the second portion thereof, the first inner face of the second portion of the first holder member and the second inner face of the second portion of the second holder member extending in the direction of the first axis to the second end, and the resin body being disposed between the first portion of the first holder member and the first portion of the second holder member, between the second portion of the first holder member and the second portion of the second holder member, and in the through-hole.

13. The optical connecting device according to claim 12, wherein the first holder member provides a first inner face in the first portion thereof, the second holder member provides a second inner face in the first portion thereof, the first inner face of the first portion of the first holder member and the second inner face of the first portion of the second holder member extend in the direction of the first axis, an interval between the first inner face of the second portion of the first holder member and the second inner face of the second portion of the second holder member is greater than that between the first inner face of the first portion of the first holder member and the second inner face of the first portion of the second holder member.

14. The optical connecting device according to claim 12, wherein the first portion of the first holder member includes a part having a thickness greater than that of the second portion of the first holder member.

15. The optical connecting device according to claim 12, wherein the first resin-uncoated fiber portion has an end at the first end of the holder part.

16. The optical connecting device according to claim 12, wherein the first holder member has an end face in the first portion thereof, the end face of the first holder member extends along a second reference plane inclined at an acute angle with respect to the first reference plane at the first end, the second holder member has an end face in the first portion thereof, the end face of the second holder member extends along a third reference plane extending in the direction of the second axis, and, the holder part has a face extending along a fourth reference plane inclined at an acute angle with respect to the second reference plane such that the face of the holder part is disposed between the end face of the first holder member and the end face of the second holder member, the first resin-uncoated fiber portion has an end face and a cladding face, and the end face of the first resin-uncoated fiber portion extends along the second reference plane and the cladding face of the first resin-uncoated fiber portion extends along the fourth reference plane.

* * * * *